(12) United States Patent
Lagnier

(10) Patent No.: US 7,225,844 B2
(45) Date of Patent: Jun. 5, 2007

(54) TREAD COMPRISING INCISIONS AND LAMELLA FOR MOLDING THESE INCISIONS

(75) Inventor: Alain Lagnier, Romagnat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/820,860

(22) Filed: Apr. 9, 2004

(65) Prior Publication Data

US 2004/0187993 A1 Sep. 30, 2004

Related U.S. Application Data

(63) Continuation of application No. PCT/EP02/11112, filed on Oct. 4, 2002.

(30) Foreign Application Priority Data

Oct. 11, 2001 (FR) ................................ 01 13137

(51) Int. Cl.
B29C 33/42 (2006.01)
B60C 11/12 (2006.01)

(52) U.S. Cl. ............................ 152/209.21; 152/DIG. 3; 425/28.1; 425/46

(58) Field of Classification Search ............ 152/209.18, 152/209.21, DIG. 3; 425/28.1, 46
See application file for complete search history.

(56) References Cited

U.S. PATENT DOCUMENTS 3,608,602 A 9/1971 Youngblood
3,692,090 A * 9/1972 Brobeck et al. .............. 425/46
4,794,965 A 1/1989 Lagnier
5,783,002 A 7/1998 Lagnier
6,116,310 A * 9/2000 Shinohara .............. 152/DIG. 3
2002/0139164 A1* 10/2002 Ishihara ................. 152/DIG. 3

FOREIGN PATENT DOCUMENTS

| EP | 564435 | * 10/1993 |
| FR | 2 703 002 | 9/1994 |
| JP | 2-310108 | * 12/1990 |
| JP | 8-175115 | * 7/1996 |
| JP | 10-080923 | 3/1998 |
| JP | 2001-219716 | 8/2001 |
| JP | 2002-192916 | * 7/2002 |

* cited by examiner

Primary Examiner—Steven D. Maki
(74) Attorney, Agent, or Firm—Buchanan Ingersoll & Rooney PC

(57) ABSTRACT

A tread of elastomeric material for tires, this tread being provided with a plurality of incisions, each incision of average width e being defined by facing walls, this tread being characterized in that at least one of the walls defining each incision comprises at least one first series and one second series of lines of motifs forming reliefs relative to said wall and having a maximum height measured perpendicular to said wall at least equal to $1/10$ of the width e, each series of lines comprising a plurality of lines extending in the same direction, the lines of the first series intersecting the lines of the second series, and in that at least one of the walls is provided over its entire surface with an average roughness of between $1/100$ and $1/10$ of the width e of the incision.

9 Claims, 2 Drawing Sheets

TREAD COMPRISING INCISIONS AND LAMELLA FOR MOLDING THESE INCISIONS

The present application is a continuation of International Application Ser. No. PCT/EP02/11112 filed on Oct. 4, 2002, and which claims priority under 35 U.S.C. §119 to Patent Application Serial No. 01/13137 filed in France on Oct. 11, 2001, the entire content of which is hereby incorporated by reference.

FIELD OF INVENTION

The invention relates to the field of tread patterns for tires. It relates more particularly to the incisions molded in the treads and the molding elements used for molding such incisions.

BACKGROUND OF INVENTION

In the context of improving the performances of its tires, the applicant company has filed several patents in which various geometries of incisions are described which, while creating additional ridges which are indispensable for cutting the film of water covering the roadway, make it possible to limit the loss of rigidity of the tread due to the presence of these incisions. For example, U.S. Pat. No. 4,794,965 describes a specific arrangement of incisions in a zigzag within the thickness of a tread; U.S. Pat. No. 5,783,002 describes an incision the opposing walls of which are provided with motifs in relief intended to fit into one another when passing into the imprint with the roadway. These various incisions ensure mechanical cooperation of the walls of rubber mix which is very appreciable for reducing the relative movements between said walls.

The development of vehicles using new driving aid systems (wheel anti-locking system when braking, anti-skid system, stability control system) mean that the requirements in terms of the performance of tires have changed.

For these vehicles, there has been discovered a need for a tire having a tread provided with a plurality of incisions to form a plurality of ridges intended to come into contact with the roadway, these incisions having a new geometry which, while limiting the reduction in overall rigidity of this tread under high shearing stresses, has the ability to reduce as far as possible the relative movements between the opposed walls once they are in at least partial contact with each other under low shearing stresses (and very particularly in rainy weather or when the roadway is wet).

In the known prior art, there are documents which state the advantage of producing on the walls of the incisions areas of roughness having specific dimensions. For example, the Japanese document published under the number 96/175115 advocates a roughness of between 20 and 300 microns.

However, it was demonstrated that merely these areas of roughness were insufficient to achieve a good compromise under all conditions of use of these tires.

SUMMARY OF THE INVENTION

To meet this need, the tire according to the invention comprises a tread having a running surface intended to be in contact with the roadway during travel of said tire. This tread is provided with a plurality of incisions extending into the thickness of the tread, each incision of average thickness e being defined by facing walls of rubber mix, each incision having an average surface Sm defined as being the location of the points substantially at the same distance from the walls defining said incision, this tread being characterized in that at least one of the walls defining each incision comprises:

at least one series of lines of motifs in relief relative to said wall and having a maximum height measured perpendicular to said wall at least equal to $1/10$ of the width e, each series of lines comprising a plurality of lines substantially parallel to each other, and in that at least one of the walls defining each incision comprises:

over its entire surface, a plurality of elements in relief regularly distributed over said wall and forming on this wall surface an average roughness of between $1/100$ and $1/10$ of the width e of the incision.

Preferably, there is formed, on at least one wall, a first series and a second series of lines of motifs in relief the maximum height of which, measured perpendicular to said wall, is at least equal to $1/10$ of the width e, the lines of the first series intersecting the lines of the second series. Advantageously, the lines of the first series form with the lines of the second series an acute angle of at least 45°.

In this manner, it is possible to obtain a tread the overall rigidity of which is relatively undisturbed by the presence of the incisions according to the invention and which comprises a large number of ridges. The incision according to the invention makes it possible, with one and the same rubber material, to increase substantially the equivalent coefficient of friction of the walls of the parts of rubber mix defining said incision. This increase in coefficient of friction is particularly effective in reducing the slight movements of one wall relative to the opposite wall and in particular close to the surface of contact with the roadway. The combined presence of lines in relief (comparable to macro-level roughness) and of surface roughness (comparable to micro-level roughness) unexpectedly increases the locking effect of one wall on the facing wall mainly in the range of low or medium stresses.

Another advantage obtained is that the tire provided with incisions according to the invention is less sensitive to the presence of water on the roadway, the dominating influence of which on the coefficient of friction between two smooth walls of one and the same rubber mix is known (a reduction of said coefficient which may be as much as 50%, or even more).

The invention is used in treads for tires of passenger vehicles or of heavy vehicles; in each respective case, the values of the macro-level roughnesses and micro-level roughnesses may be readily adapted as a function of the average widths of the incisions, which may be as much as 3 mm.

Preferably, the lines of motifs in relief of each series of at least one wall are substantially inclined by an angle β of between 10° and 80° with a direction perpendicular to the running surface of the tread, and this over at least part of their length.

Another subject of the invention relates to a lamella intended for fitting in a tread mould of elastomeric material, this lamella comprising main faces for molding in a tread facing walls defining an incision of average thickness e, at least one of the main faces of the lamella comprising at least one series of lines of hollowed motifs relative to said wall and having a maximum depth measured perpendicular to said wall at least equal to $1/10$ of the width e, each series of lines of motifs comprising a plurality of lines substantially parallel to each other, at least one of the main faces of the lamella comprising over its entire surface an equivalent average roughness of between 1/100 and 1/10 of the width e of the incision.

"Line of hollowed motifs" may mean a continuous line or a line formed of discontinuous motifs. Preferably, at least one main face of the lamella according to the invention is provided with a first series and a second series of lines of hollowed motifs, the lines of each series extending in one and the same direction, and the lines of the first series intersecting the lines of the second series to form an average acute angle α at least equal to 45°.

BRIEF DESCRIPTION OF THE DRAWINGS

Other characteristics and advantages of the invention will become apparent from the description given hereafter with reference to the appended drawings, which show, by way of non-limitative example, forms of embodiment of the invention.

In these drawings.

DESCRIPTION OF THE PREFERRED EMBODIMENTS

Figure 1:
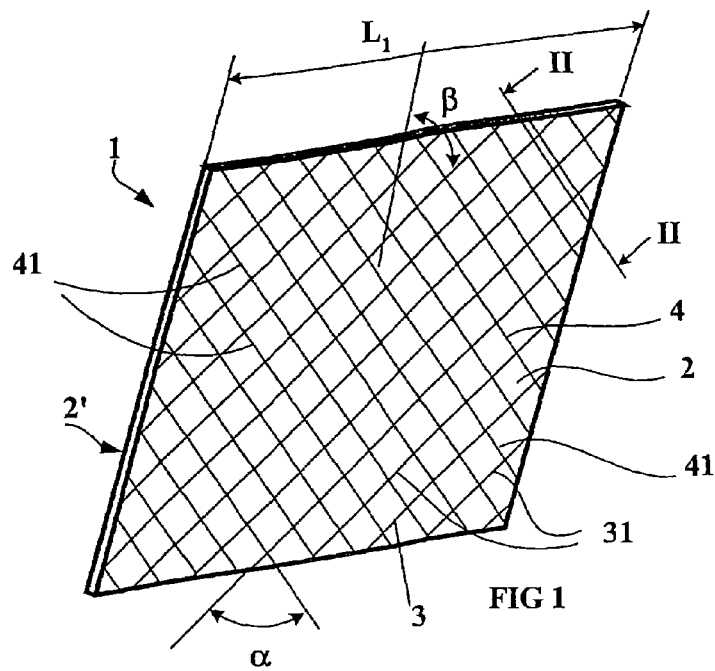
FIG. 1 shows a metal lamella used for molding an incision according to the invention.

In FIG. 1, there can be seen a lamella 1 of plane overall geometry comprising two main faces 2, 2' intended for molding the facing walls defining an incision according to the invention in a tread. The thickness of the lamella measured between the two main faces is equal in the case described to 0.6 mm. The average surface of this lamella is here a plane surface dividing the lamella into two parts of the same volume and extending at half-thickness.

Over all of each main face 2 and 2', a surface treatment by shot blasting has been carried out in order to obtain on the walls of rubber material molded with the lamella a uniform micro-level roughness of between 1/10 and 1/100 of the thickness of the lamella. This surface treatment produces a plurality of cavities 3 and 3' regularly distributed over the main faces of the lamella, said cavities having in the present case a maximum depth of between 40 and 50 μm. These cavities 3 and 3' are visible more particularly in FIG. 2, which shows a view in section along the line II—II of the lamella 1.

Furthermore, two series 3, 4 of substantially rectilinear grooves 31, 41 have been formed on each main face 2 and 2' of the lamella 1. The grooves 31 of the first series 3 have a triangular cross-section and have a maximum depth of 0.1 mm and a maximum width of 0.5 mm; these grooves 31 are, in the present case, rectilinear and parallel to each other and distant from each other by an average pitch equal to 1 mm. The average pitch between the grooves is preferably at least equal to 5% of the average length L, of the incision and at most equal to 20% of this same length L, (this length $L_1$, which in the present case is equal to 20 mm, being measured parallel to a direction parallel to the running surface of a tread molded in a mould provided with said lamella).

In the case described, the grooves 31 of the wall 2 form an oblique angle β equal to 25° with a direction perpendicular to the running surface of the tread (this direction is perpendicular to the direction in which the length $L^1$ is measured).

The grooves 41 of the second series 4 on the same main face 2 have the same characteristics as those of the first series and intersect the latter, forming an average acute angle a equal to 45°.

The series of grooves produced on the other main face 2' of the lamella have characteristics similar to those which have just been described. It is of course possible to produce on the second main face grooves having different orientations from those produced on the first main face in order to improve still further the interaction between the facing faces of the incision molded with this lamella.

The grooves formed on the main faces of the lamella result in molding of ribs (in relief) on the walls defining the incision molded with said lamella; it will be considered here that these series of ribs form a macro-level roughness.

It was observed that the combination of micro-level roughness with macro-level roughness (as defined in the present specification) makes it possible to achieve better balance during travel, whether in the field of low stresses or of medium stresses.

Figure 2:
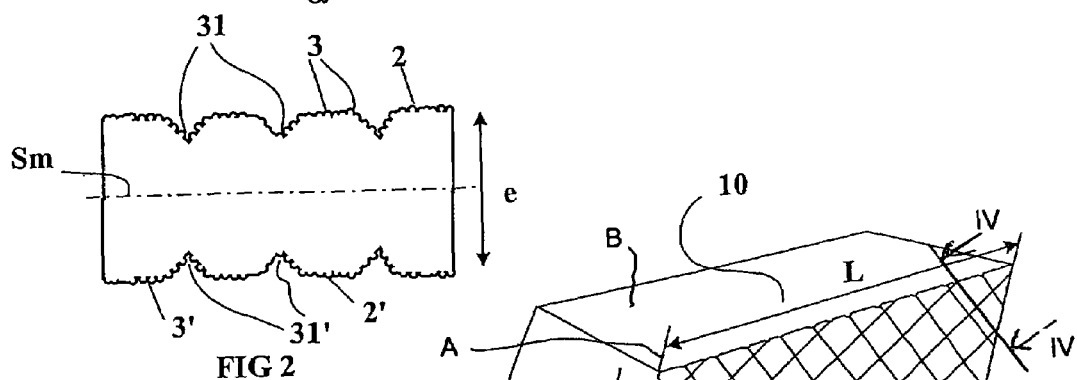
FIG. 2 shows a sectional view along the line II—II through the lamella shown in FIG. 1.

FIG. 2, which represents a view in section of the lamella 1 along the line II—II, shows the profiles in section of the grooves 31 and 31': the latter are substantially triangular. On the other hand, the area of micro-level roughness formed by the plurality of cavities 3 and 3' is visible on the main faces 2 and 2', including on said grooves.

Furthermore, provision may be made for the incisions to have average surfaces the geometric forms of which are appropriate to permit mechanical cooperation by interleaving of the opposing walls defining said incisions. This mechanical cooperation offers the advantage of taking over the locking obtained with the areas of micro-level and macro-level roughnesses according to the invention as the stresses increase substantially.

Figure 3:
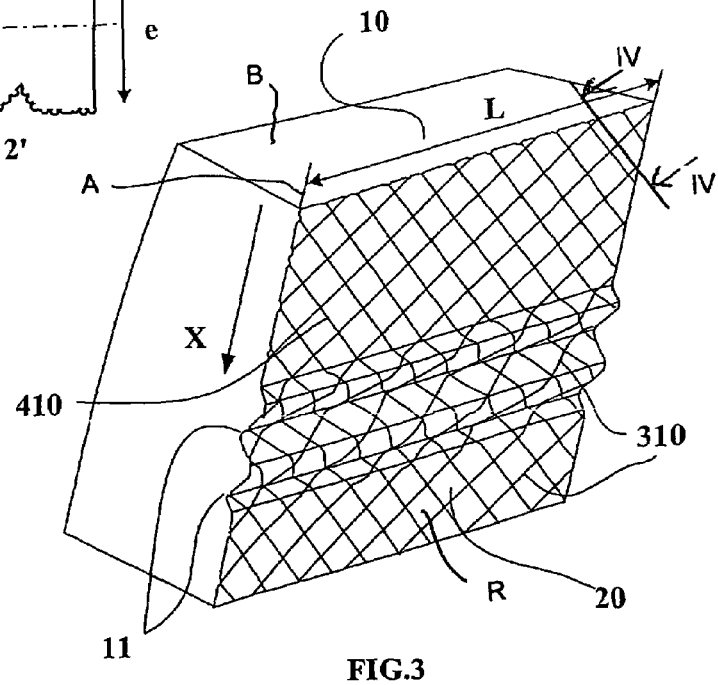
FIG. 3 shows a rubber wall of an incision according to the invention produced in a tread.
Figure 4:
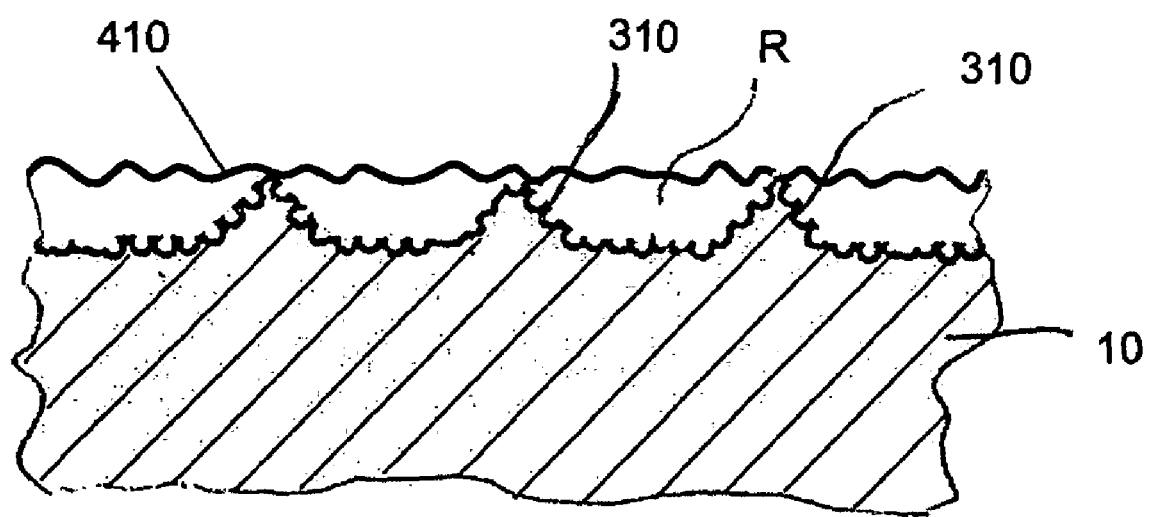
FIG. 4 shows a sectional view along the line IV—IV shown in FIG. 3.

FIG. 3 shows a wall 20 of an incision according to the invention, this incision being molded in a tread pattern block 10 of a rubber tread. This wall 20 of width L comprises undulations 11 about a direction X perpendicular to said width L (this direction X extends within the thickness of the tread pattern block 10), said undulations extending over this entire length L. These undulations are formed on the facing walls defining the incision and permitting mechanical meshing of one wall on the other when passing into contact with the roadway. Furthermore, the wall 20 comprises a combination of micro-level and macro-level roughnesses (the latter being in the form of ribs or lines of motifs in relief represented diagrammaticaily by the lines 310 and 410 which intersect and pass through one another to form closed recesses R therebetween, as shown in FIG. 4). The lines of relief 310, 410 extend obliquely relative to a line A oriented parallel to the running surface B of the tread.

In the case described with reference to FIG. 3, the areas of micro-level roughness are identical to those obtained by molding with the lamella described with the support of FIG. 1.

The combination of the mechanical meshing by the presence of undulations, of the areas of micro-level roughness and the areas of macro-level roughness as defined here imparts to the tire provided with a tread according to the invention performances which are improved still further and in particular during the implementation of the wheel anti-locking or anti-skid system.

The invention is not limited to the examples described and shown, and various modifications can be made thereto without departing from the scope thereof. For example, the series of reliefs molded on the walls defining an incision may have, viewed projected on to a plane surface tangent to one of the walls, non-rectilinear traces in particular of circular forms whether concentric or not, zigzag forms, undulating forms, etc.

Equivalently, the lines of reliefs may be formed of sections of lines forming sorts of discontinuous lines, the space between each section being less than the average length of said sections.

What is claimed is:

1. A tread made of elastomeric material for tires, this tread being provided with a plurality of incisions, each incision of average width e and of average surface Sm being defined by facing walls, wherein at least one of the walls defining each incision comprises at least first and second series of lines of motifs in relief relative to said wall and having a maximum height measured perpendicular to said wall at least equal to $\frac{1}{10}$ of the width e, and in that at least one of the walls defining each incision furthermore comprises over its entire surface an average roughness of between $\frac{1}{100}$ and $\frac{1}{10}$ of the width e of the incisions, wherein the first and second series of lines of motifs in relief have a maximum height measured perpendicular to said wall at least equal to $\frac{1}{10}$ of the width e, each series of lines comprising a plurality of lines extending in substantially the same direction, the lines of the first series intersecting and passing through the lines of the second series to form closed recesses therebetween.

2. The tread according to claim 1, wherein the lines of the first series form with the lines of the second series an average acute angle $\alpha$ at least equal to 45°.

3. The tread according to claim 1, wherein the average surface Sm of at least one incision has a non-planar geometry appropriate so that the walls defining said incision are capable of cooperating mechanically with each other when passing into contact with the roadway, in order to reduce the movements of one wall relative to the other.

4. The tread according to claim 3, wherein the average surface Sm comprises at least one undulation in the direction perpendicular to this average surface.

5. The tread according to claim 1, wherein the lines in relief of at least one wall are inclined by an angle $\beta$ of between 10° and 80° with a direction perpendicular to the running surface of the tread.

6. The tread according to claim 1, wherein the average pitch between the lines of each series of lines in relief is at least equal to 5% of the length L of the incision and at most equal to 20% of this same length L.

7. The tread according to claim 1 wherein the first and second series of lines of motif extend obliquely relative to a line oriented perpendicular to the running surface of the tread.

8. A lamella intended for fitting in a tread mould of elastomeric material, this lamella comprising main faces for molding in a tread facing walls defining an incision of average thickness e, at least one of the main faces of the lamella comprising at least a first and second series of lines of motifs forming hollows relative to said wall and having a maximum depth measured perpendicular to said wall at least equal to $\frac{1}{10}$ of the width e, each series of lines comprising a plurality of lines substantially parallel to each other, at least one of the main faces of the lamella comprising over its entire surface an equivalent average roughness of between $\frac{1}{100}$ and $\frac{1}{10}$ of the width e of the incision, wherein the first and second series of lines of motifs are regularly distributed over said wall and have a depth at least equal to $\frac{1}{10}$ of the width e, the lines of motifs of each of the first and second series extending in substantially the same direction, the lines of the first series intersecting and passing through the lines of the second series, forming an acute angle at least equal to 45°.

9. The lamella intended for fitting in a tread mould according to claim 8, wherein furthermore motifs in relief are formed on each main wall of said lamella, the motifs in relief of one wall being complementary with the motifs in relief of the other wall in order to permit mechanical cooperation of the walls defining the incision molded with said lamella, this mechanical cooperation limiting the relative movements of the facing walls.

* * * * *